(12) United States Patent
Yelamarti et al.

(10) Patent No.: US 12,335,234 B2
(45) Date of Patent: Jun. 17, 2025

(54) SYSTEMS AND METHODS FOR AUTOMATIC CONNECTION OF CLIENT DEVICE TO REMOTE PRIVATE NETWORK

(71) Applicant: Verizon Patent and Licensing Inc., Basking Ridge, NJ (US)

(72) Inventors: Srinivasu Yelamarti, Flower Mound, TX (US); Srirama R Kalidindi, Flower Mound, TX (US); Sanjay Ahuja, Irving, TX (US); Anjaneya Pericharla, Irving, TX (US); Ramesh Nagathan, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 193 days.

(21) Appl. No.: 17/985,308

(22) Filed: Nov. 11, 2022

(65) Prior Publication Data
US 2024/0163250 A1    May 16, 2024

(51) Int. Cl.
*H04L 9/40*        (2022.01)
*H04L 61/5014*    (2022.01)

(52) U.S. Cl.
CPC ...... *H04L 63/0236* (2013.01); *H04L 61/5014* (2022.05); *H04L 63/0272* (2013.01)

(58) Field of Classification Search
CPC ............ H04L 63/0236; H04L 61/5014; H04L 63/0272
See application file for complete search history.

(56) References Cited

U.S. PATENT DOCUMENTS

| | | | |
|---|---|---|---|
| 11,997,219 B1* | 5/2024 | Russell | H04L 9/3268 |
| 2010/0142410 A1* | 6/2010 | Huynh Van | H04L 12/4641 370/255 |
| 2022/0174493 A1* | 6/2022 | Elsins | H04L 63/108 |
| 2022/0278889 A1* | 9/2022 | Malleshaiah | H04L 41/0631 |

\* cited by examiner

*Primary Examiner* — Kristie D Shingles

(57) ABSTRACT

One or more computing devices, systems, and/or methods for automatically connecting a client device to a remote private network are provided. In an example, a networking device receives, from a client device, a first network-access request indicative of a first service set identifier (SSID). In response to the first network-access request, the networking device (i) establishes an encrypted connection between the networking device and a remote private network, and (ii) provides the client device with access to resources of the remote private network via the encrypted connection.

18 Claims, 14 Drawing Sheets

SYSTEMS AND METHODS FOR AUTOMATIC CONNECTION OF CLIENT DEVICE TO REMOTE PRIVATE NETWORK

BACKGROUND

Many entities (e.g., organizations, businesses, universities, and other entities) implement private networks for their industry-specific data and/or communication needs. For example, a private network may be deployed to host applications, store files, etc. for access by users (e.g., employees and/or clients of a business, students and/or teachers of a university, etc.).

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1A:
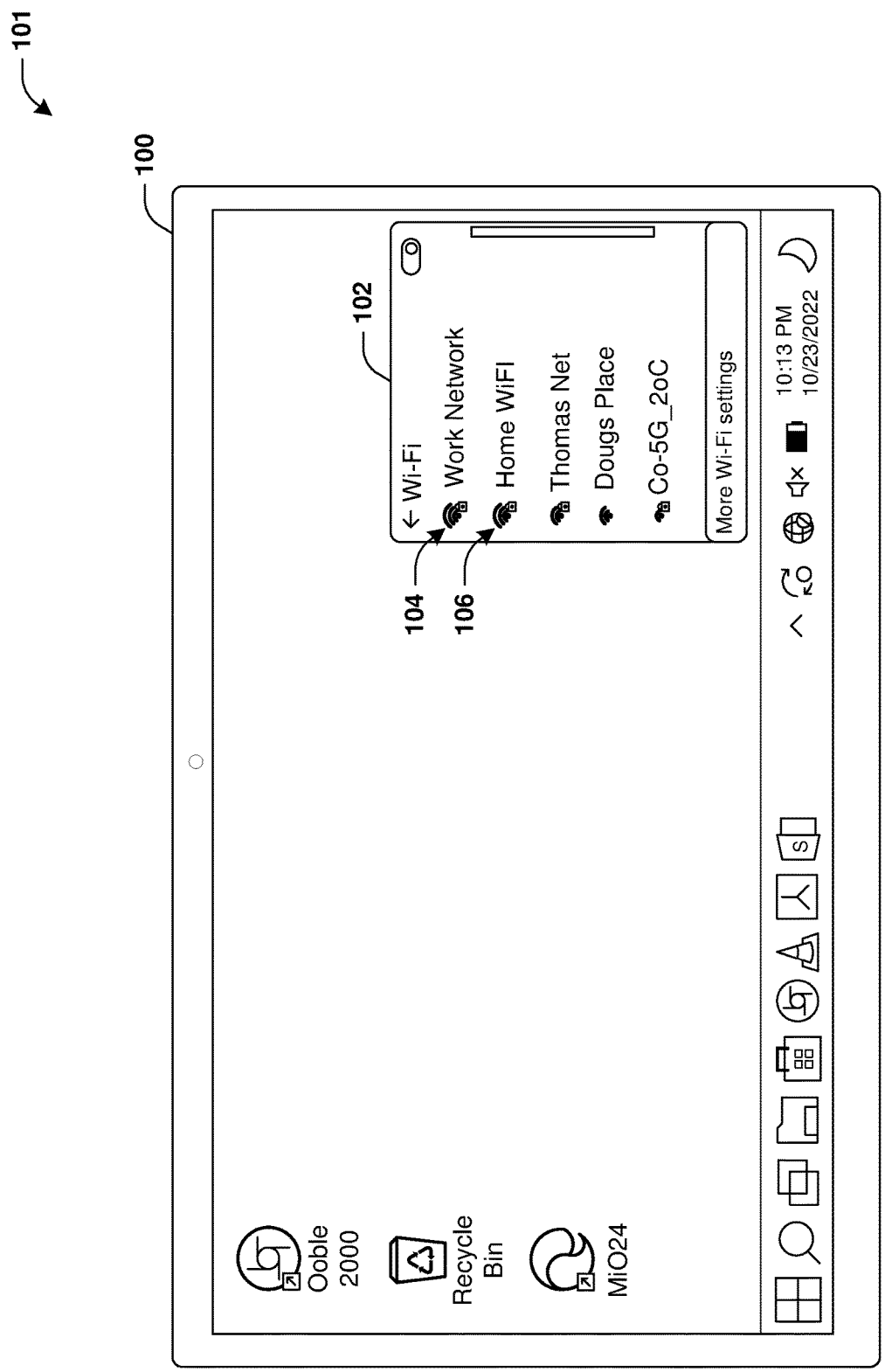
FIG. 1A is a diagram illustrating an example system for providing client devices with network connections using a plurality of service set identifiers (SSIDs), where a client device displays a list of SSIDs according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for connecting a client device to a remote private network are provided. Many entities (e.g., organizations, businesses, universities, and other entities) implement private networks for their industry-specific data and/or communication needs. For example, a private network may be deployed for an entity to host applications, store files, etc. for access by users (e.g., employees and/or clients of a business, students and/or teachers of a university, etc.). A user (e.g., an employee, a client, a teacher, etc.) of the entity may want to access the private network remotely (e.g., from home, from a coffee shop, etc.). However, some systems require complex remote connection configurations that can make it difficult for the user to connect to the private network. For example, the user may be required to manually install and/or configure one or more virtual private network (VPN) configurations to connect to the private network, which may take a significant amount of the user's time.

Accordingly, techniques for automatically connecting to a remote private network are provided. In an example implementation, a networking device (e.g., a client-side router and/or a mobile hotspot device) may be configured with a first service set identifier (SSID) (e.g., "Work Network") that is associated with (e.g., dedicated to) connecting to a remote private network. A user of a client device may select the first SSID from a list of available SSIDs. In response to the selection of the first SSID, the client device may transmit a network-access request, indicating the first SSID, to the networking device, which may automatically (and/or without manual intervention) establish an encrypted connection with the remote private network and allow the client device to access resources of the remote private network. The networking device may be configured with a second SSID (e.g., "Home WiFi" for normal Internet usage). In response to a selection of the second SSID (from the list of SSIDs), the networking device may connect the client device to the Internet, and/or may disconnect the established encrypted connection with the remote private network. In some examples, the networking device may be configured with a network configuration associated with the first SSID. The network configuration may be enabled (in a one-time provisioning process, for example) on the networking device, and may be used thereafter to establish encrypted connections with the remote private network without requiring manual effort, troubleshooting, etc.

In an example implementation, the client device may comprise an embedded Subscriber Identity Module (eSIM) configured with a first eSIM profile associated with (e.g., dedicated to) connecting to a remote private network and/or a second eSIM profile (for normal Internet usage, for example). In response to a selection of the first eSIM profile, the client device may automatically (and/or without manual intervention) establish an encrypted connection with the remote private network and access resources of the remote private network over the encrypted connection. In response to a selection of the second eSIM profile, the client device may establish a connection with the Internet, and/or may disconnect the established encrypted connection with the remote private network.

Accordingly, using the techniques provided herein, the user may conveniently and/or more quickly (i) connect to the remote private network, (ii) disconnect from the remote private network, and/or (iii) switch between being connected to the remote private network (e.g., via the first SSID and/or the first eSIM profile) and being connected to the Internet (e.g., via the second SSID and/or the second eSIM profile). For example, the user may connect to the remote private network with a single click (e.g., a selection of the first SSID or the first eSIM profile) without the complexities of manually configuring and/or managing VPN connections on the client device.

FIGS. 1A-1G illustrate an example of a system 101 for providing client devices with network connections using a plurality of SSIDs. The plurality of SSIDs may comprise a first SSID associated with a connection to a first remote private network, a second SSID associated with a connection to a public network (e.g., the Internet), and/or one or more other SSIDs. In an example, the first remote private network may be associated with a first entity, such as at least one of an enterprise, an organization, a company, a business, a school, a university, etc. The first remote private network may correspond to at least one of a work network, an office network, a corporate network, etc. that a user associated with the first entity (e.g., an authorized employee, researcher, professor, student, etc. of the first entity) may access to perform work functions, administrative tasks, research, etc. (for the first entity, for example). For example, the user may connect to the first remote private network to at least one of (i) access files stored on one or more file computers (e.g., one or more file servers) of the first remote private network, and/or (ii) access and/or interact with one or more applications hosted by one or more application computers (e.g., one or more application servers) of the first remote private network.

FIG. 1A illustrates a client device 100 displaying a list of SSIDs 102 comprising the plurality of SSIDs. The client device 100 may be at least one of a laptop, a phone, a tablet, etc. The list of SSIDs 102 may comprise (i) one or more SSIDs that are broadcasted by networking devices (e.g., routers, access points, mobile hotspots, etc.) within range of the client device 100 (e.g., within a threshold distance of the client device 100) and/or (ii) one or more SSIDs associated with network configurations that the client device 100 is configured with.

Each SSID in the list of SSIDs 102 may correspond to a network name (e.g., a wireless network name) of a network (e.g., a wireless network). In the example shown in FIG. 1A, the first SSID (shown with reference number 104) may comprise "Work Network", and the second SSID (shown with reference number 106) may comprise "Home WiFi". The first SSID 104 (associated with a connection to the first remote private network) and/or the second SSID 106 (associated with a connection to the public network) may be broadcasted by a networking device 114 (shown in FIGS. 1B-1G). Alternatively and/or additionally, broadcasting of the first SSID 104 and/or the second SSID 106 may be disabled (e.g., such that the first SSID 104 and/or the second SSID 106 are not shown in lists of SSIDs by unknown client devices that are within range of the networking device 114, which may provide for increased security).

Figure 1B:
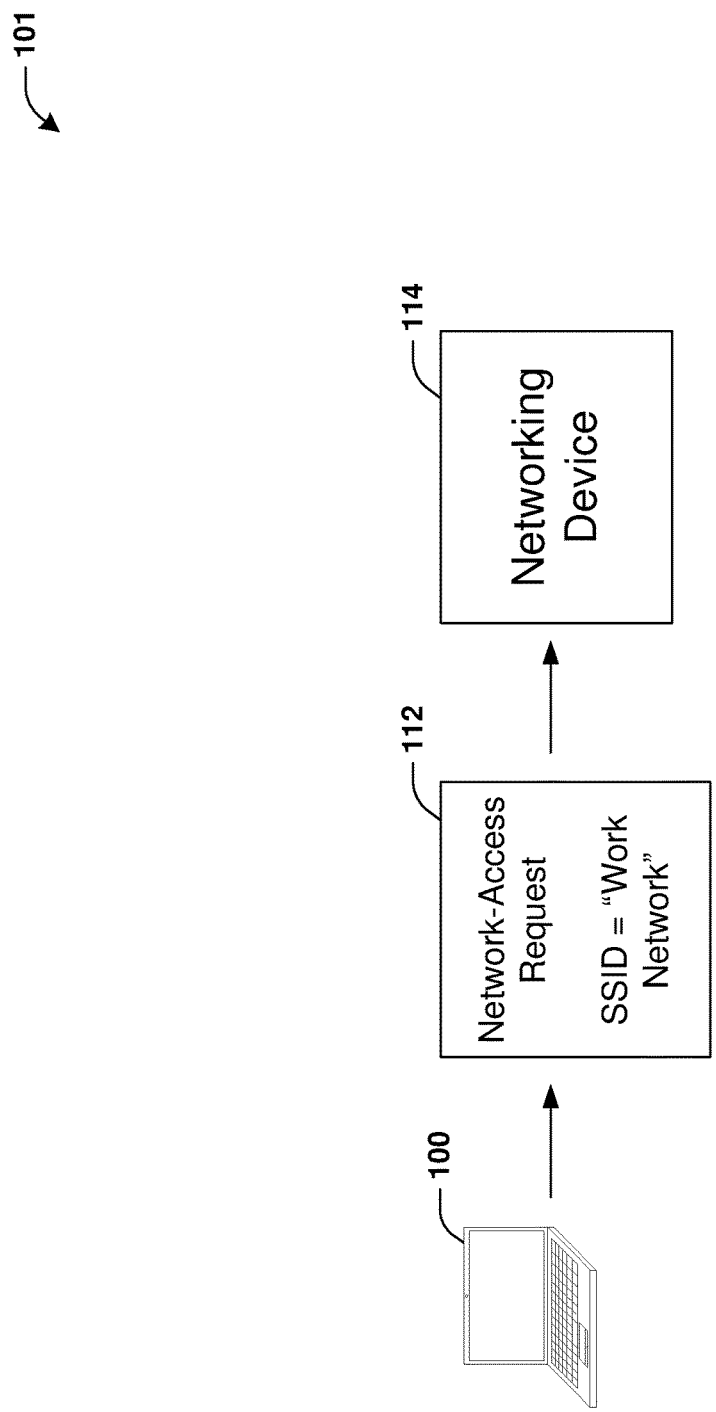
FIG. 1B is a diagram illustrating an example system for providing client devices with network connections using a plurality of SSIDs, where a first network-access request is received according to some embodiments.
Figure 1C:
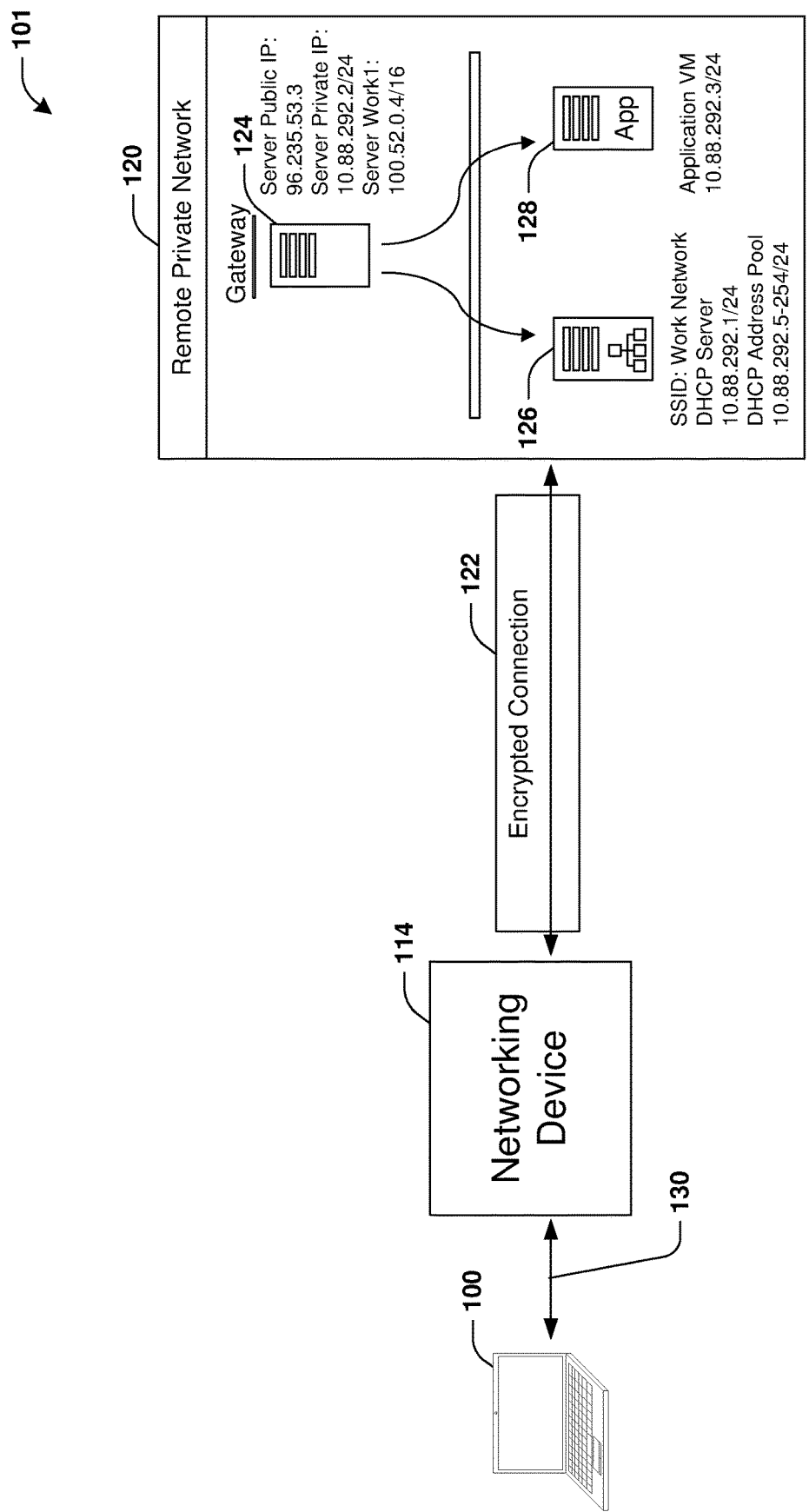
FIG. 1C is a diagram illustrating an example system for providing client devices with network connections using a plurality of SSIDs, where an encrypted connection is established according to some embodiments.
Figure 1D:
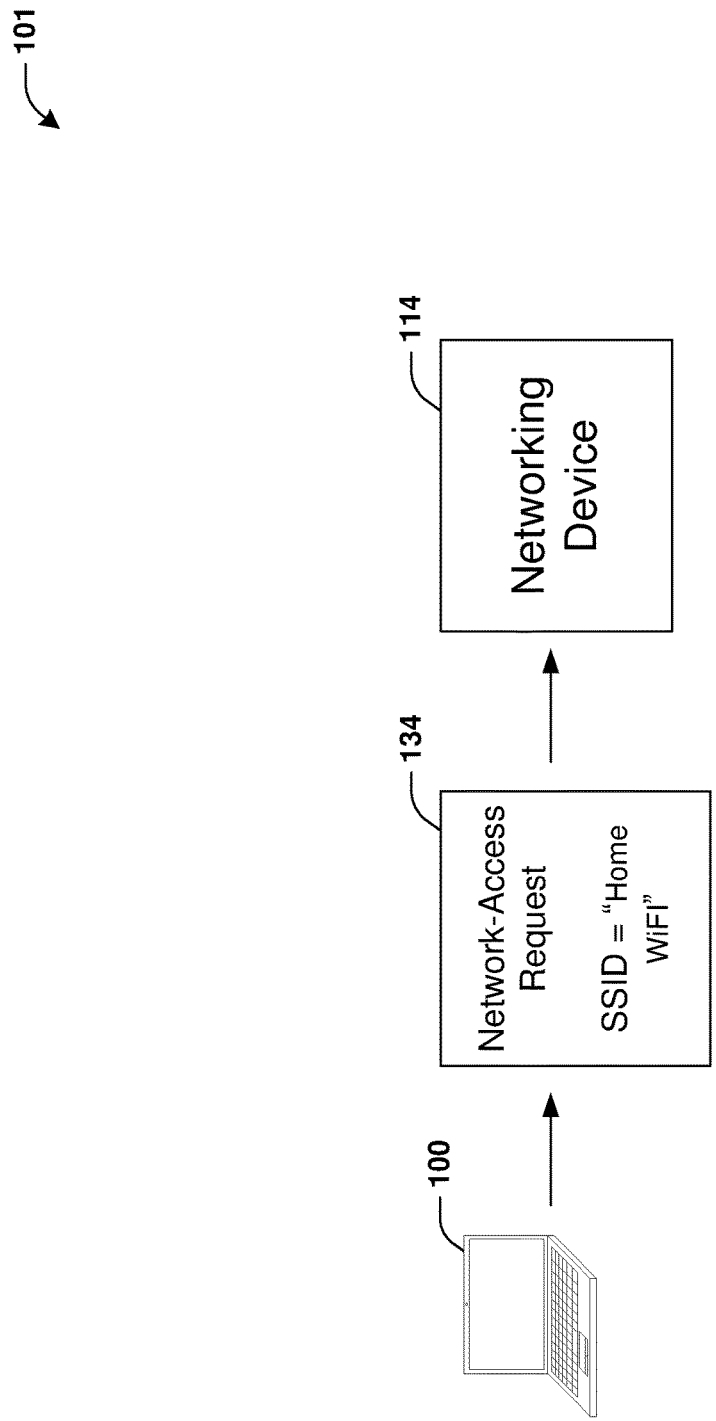
FIG. 1D is a diagram illustrating an example system for providing client devices with network connections using a plurality of SSIDs, where a second network-access request is received according to some embodiments.
Figure 1E:
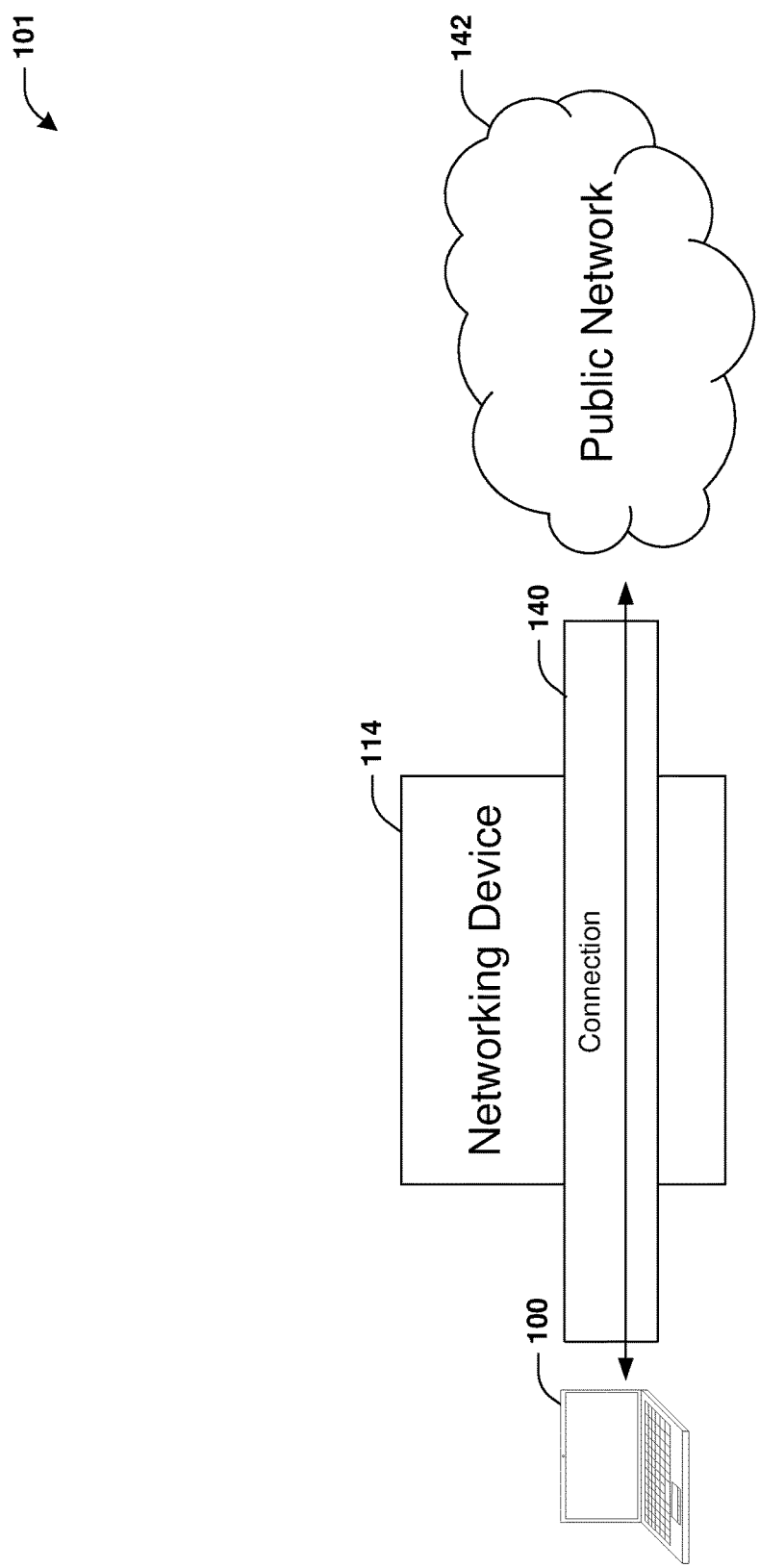
FIG. 1E is a diagram illustrating an example system for providing client devices with network connections using a plurality of SSIDs, where a connection is established according to some embodiments.
Figure 1F:
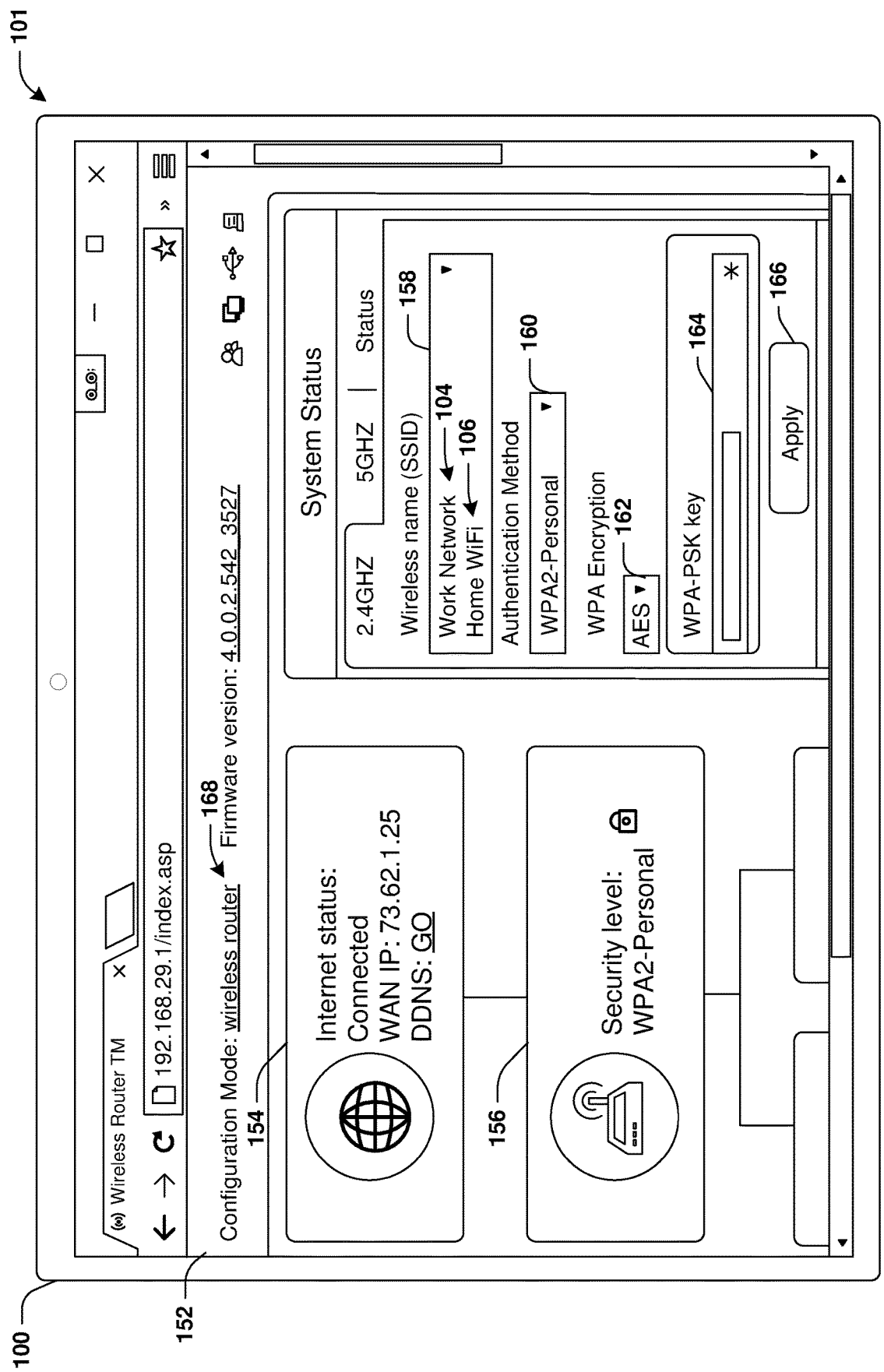
FIG. 1F is a diagram illustrating an example system for providing client devices with network connections using a plurality of SSIDs, where a networking device configuration interface is displayed on a client device according to some embodiments.
Figure 1G:
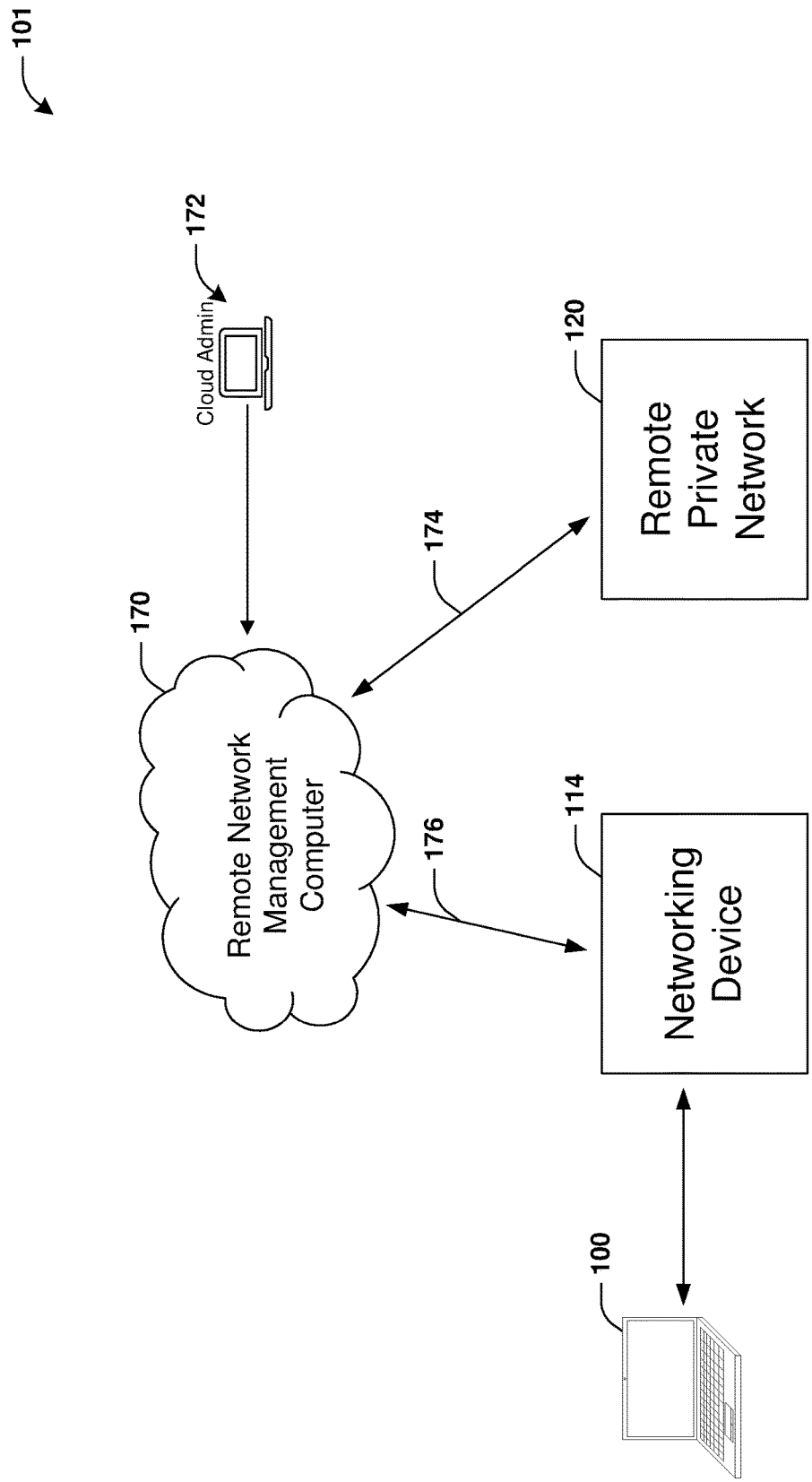
FIG. 1G is a diagram illustrating an example system for providing client devices with network connections using a plurality of SSIDs, where a remote network management computer communicates with one or more devices according to some embodiments.
Figure 2:
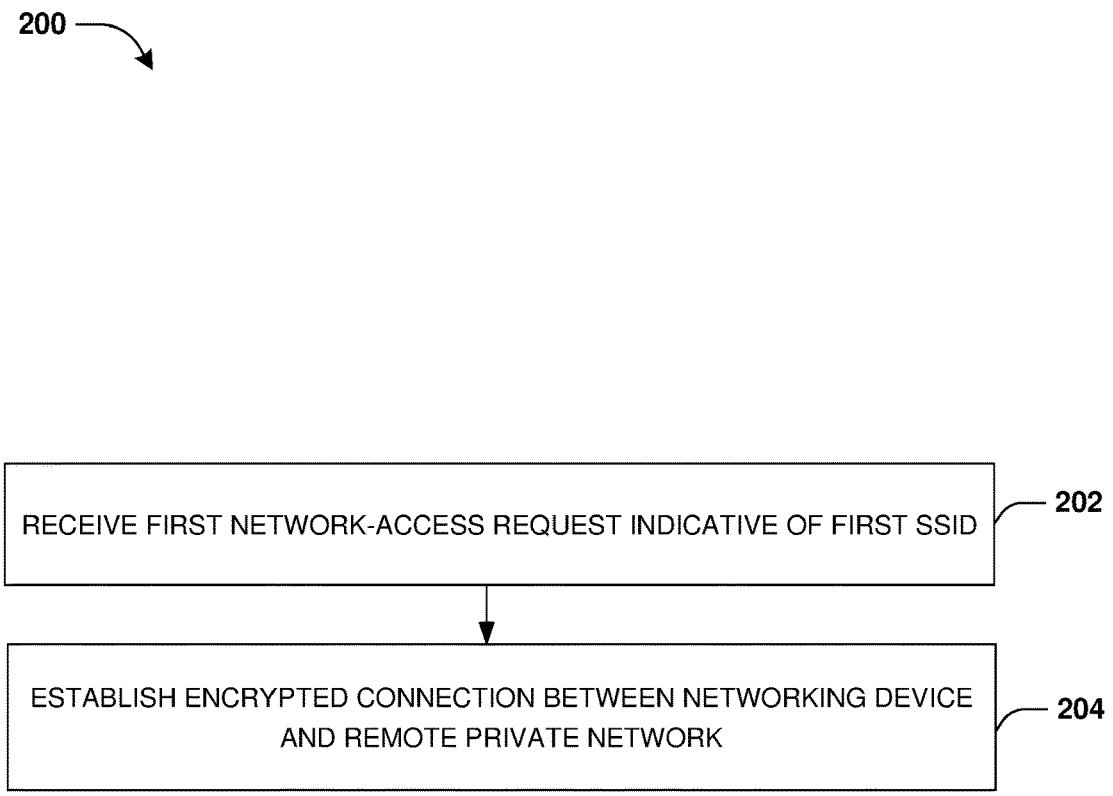
FIG. 2 is a flow chart illustrating an example method for providing client devices with network connections using a plurality of SSIDs in accordance with an embodiment.

An embodiment of providing client devices with network connections using the plurality of SSIDs is illustrated by an example method 200 of FIG. 2, and is further described in conjunction with FIGS. 1A-1G. At 202, the networking device 114 may receive a first network-access request, indicative of the first SSID 104 (e.g., "Work Network"), from the client device 100. FIG. 1B illustrates reception of the first network-access request (shown with reference number 112) by the networking device 114. In some examples, the client device 100 may transmit the first network-access request 112 indicating the first SSID 104 in response to a selection of the first SSID 104 from the list of SSIDs 102 (shown in FIG. 1A).

In some examples, the networking device 114 comprises a client-side router (e.g., a home router, a broadband home router (BHR), a satellite office router, etc.). For example, the client-side router may be positioned in a fixed location (e.g., in at least one of a home, a home office, a satellite office, etc.) and/or may be used by one or more users (e.g., a household) at the fixed location to access the Internet and/or one or more remote private networks. In some examples, the client-side router may connect one or more client devices to one or more networks (e.g., the Internet, one or more remote private networks, etc.) by performing wide area network (WAN) routing.

Alternatively and/or additionally, the networking device 114 may comprise a mobile hotspot device. The mobile hotspot device may be portable, and may provide devices (e.g., devices that are within range of the mobile hotspot device) with network connections (e.g., Internet connections). For example, the mobile hotspot device may be connected with the client device 100 over a wireless local area network (WLAN). The mobile hotspot device may have internet service provided by a telecommunication service (e.g., the internet service may comprise at least one of cellular internet service, 5G internet service, 4G internet service, satellite internet service, and/or other type of internet service). When the mobile hotspot device is within coverage of the telecommunication service (e.g., when the mobile hotspot device is within a threshold distance of a base station of the telecommunication service), the mobile hotspot device may share the internet service with the client device 100 (over the WLAN, for example). In some examples, the mobile hotspot device may comprise a smartphone, a wearable device, etc. that has a mobile hotspot (e.g., personal hotspot) function in addition to other features for at least one of calling, browsing, texting, etc. Alternatively and/or additionally, the mobile hotspot device may comprise a portable hotspot (e.g., a dedicated and/or standalone hotspot device, such as a portable hotspot device comprising a modem and/or router) configured to provide the client device 100 (and/or one or more other client devices within range) with network connections (e.g., Internet connections).

At 204, in response to receiving the first network-access request 112, the networking device 114 may establish a first encrypted connection between the networking device 114 and the first remote private network. Alternatively and/or additionally, the networking device 114 may provide the client device 100 with access to resources (e.g., files, applications, etc.) of the first remote private network. For example, the resources of the first remote private network may be accessed via the first encrypted connection.

In some examples, the first encrypted connection may be established in response to client authentication (e.g., successful client authentication) of the client device 100. The client authentication may be performed to verify that the client device 100 and/or a user of the client device 100 are authorized to (i) connect to the networking device 114, (ii) connect to the first remote private network, and/or (iii) access resources of the first remote private network. In some examples, the client authentication may comprise (i) the client device 100 transmitting one or more first credentials (e.g., at least one of a certificate, a key, a username, a password, a client identifier of the client device 100, etc.) to the networking device 114 (e.g., the client device 100 may retrieve the one or more first credentials from memory and/or the one or more first credentials may be manually input by the user via an authentication interface on the client device 100), (ii) the networking device 114 authenticating the client device 100 based upon the one or more first credentials (e.g., the networking device 114 may authenticate the client device 100 by comparing the one or more first credentials with one or more credentials stored on the networking device 114), (iii) the networking device 114 transmitting one or more second credentials to the first remote private network and/or an authentication computer (e.g., an authentication server configured to manage security of the first remote private network), wherein the one or more second credentials may comprise one, some and/or all of the one or more first credentials), and/or (iv) the first remote private network and/or the authentication computer authenticating the client device 100 and/or the networking device 114 based upon the one or more second credentials, wherein the first remote private network and/or authentication computer may transmit an authentication success message, indicating successful authentication, to the networking device 114 in response to authenticating the client device and/or the networking device 114.

FIG. 1C illustrates establishment of the first encrypted connection (shown with reference number 122) between the networking device 114 and the first remote private network (shown with reference number 120). In some examples, the first encrypted connection 122 may be established via a VPN, via tunneling (e.g., at least one of WireGuard® tunneling, secure shell (SSH) tunneling, etc.), and/or via one or more other techniques. The first encrypted connection 122 may be a secure peer-to-peer (P2P) connection (e.g., a user datagram protocol (UDP) connection over port 51820). Alternatively and/or additionally, the first encrypted connection 122 may comprise a zero-touch VPN connection in a secure tunnel, and/or may be established using a software defined wide area network (SD-WAN)-based architecture.

In some examples, the first remote private network 120 comprises a gateway computer 124 (e.g., a gateway server), a Dynamic Host Configuration Protocol (DHCP) server 126 and/or one or more application computers 128 (e.g., one or more application servers and/or one or more application virtual machines). The first encrypted connection 122 may comprise a peer-to-peer connection between the networking device 114 and the gateway computer 124.

In some examples, the DHCP server 126 is configured to assign a first client identifier (e.g., a first Internet Protocol (IP) address) for the client device 100. The DHCP server 126 may select the first client identifier from an address pool (e.g., a DHCP address pool) comprising a plurality of client identifiers (e.g., a plurality of IP addresses). In an example, the address pool may comprise IP addresses 10.88.292.5-254/24, and the first client identifier may comprise IP address 10.88.292.5/24. In some examples, the networking device 114 may receive an assignment of the first client identifier (for the client device 100) from the DHCP server 126. For example, the DHCP server 126 may transmit the assignment of the first client identifier to the gateway computer 124, which may transmit the assignment to the networking device 114 (using the first encrypted connection 122, for example). The first client identifier may be used to identify the client device 100 in association with activity performed over the first encrypted connection 122 between the networking device 114 and the first remote private network 120. In an example, traffic over the first encrypted connection 122 may comprise an indication of the first client identifier (to indicate that the traffic is associated with the client device 100, for example). The first client identifier may correspond to a private client identifier (e.g., a private IP address).

In some examples, the first client identifier may be different than a second client identifier (e.g., a second IP address) that is used to identify the client device 100 in association with activity performed over a connection between the client device 100 and the public network (e.g., the Internet). Alternatively and/or additionally, the first client identifier may be different than a public identifier (e.g., a public IP address) of the client device 100 and/or a public identifier (e.g., a public IP address) of the networking device 114.

In some examples, the client device 100 may be provided with access to one or more resources of one or more applications hosted on the one or more application computers 128. For example, the gateway computer 124 may communicate with the one or more application computers 128 in the first remote private network 120 to retrieve the one or more resources of the one or more applications, and may provide the networking device 114 with the one or more resources over the first encrypted connection 122. The networking device 114 may provide the client device 100 with the one or more resources via communication 130 (e.g., encrypted wireless communication) between the client device 100 and the networking device 114.

In some examples, the client device 100 may be provided with access to one or more resources (e.g., data comprising at least one of files, documents, videos, audio files, raw data, structured data, etc.) stored on one or more file computers (not shown) of the first remote private network 120. For example, the gateway computer 124 may communicate with the one or more file computers in the first remote private network 120 to retrieve the one or more resources stored on the one or more file computers, and may provide the networking device 114 with the one or more resources over the first encrypted connection 122. The networking device 114 may provide the client device 100 with the one or more resources via communication 130 (e.g., encrypted wireless communication) between the client device 100 and the networking device 114.

In some examples, in response to receiving the first network-access request 112 and/or authenticating (e.g., successfully authenticating) the client device 100, the first encrypted connection 122 may be established (by the networking device 114) automatically and/or without manual intervention. In this way, the client device 100 may connect to the first remote private network 120 by merely sending the first network-access request 112 and/or the one or more first credentials to the networking device 114 (without requiring the client device 100 to set up and/or establish the first encrypted connection 122, for example). For example, a user of the client device 100 may merely have to select the first SSID 104 (from the list of SSIDs 102 shown in FIG. 1A) to connect to the first remote private network 120.

In some examples, when the first encrypted connection 122 is established (for the client device 100, for example), the networking device 114 may direct all network traffic from the client device 100 to the first remote private network 120 over the first encrypted connection 122. Alternatively and/or additionally, the networking device 114 may direct merely a first subset of network traffic from the client device 100 to the first remote private network 120, and may direct a second subset of network traffic from the client device 100 to the public network (e.g., the Internet). The first subset of network traffic may comprise network traffic that is (i) indicative of the first client identifier and/or a private client identifier (e.g., a private IP address, such as 172.16.0.0/16) of the client device 100, and/or (ii) addressed to the first remote private network 120. The second subset of network traffic may comprise network traffic that is (i) indicative of the second client identifier, a public identifier (e.g., a public IP address) of the client device 100 and/or a public identifier (e.g., a public IP address) of the networking device 114, and/or (ii) addressed to one or more IP addresses in the public network.

The networking device 114 may receive a second network-access request, indicative of the second SSID 106 (e.g., "Home WiFi"), from the client device 100. FIG. 1D illustrates reception of the second network-access request (shown with reference number 134) by the networking device 114. In some examples, the client device 100 may transmit the second network-access request 134 indicating the second SSID 106 in response to a selection of the second SSID 106 from the list of SSIDs 102 (shown in FIG. 1A).

In response to receiving the second network-access request 134, the networking device 114 may establish a connection (e.g., a direct connection) between the client device 100 and the public network (e.g., the Internet). Alternatively and/or additionally, the networking device 114 may provide the client device 100 with access to resources (e.g., files, applications, etc.) of the public network. For example, the resources (e.g., internet resources) of the public network may be accessed via the connection.

In some examples, the connection may be established in response to client authentication of the client device 100. The client authentication may be performed to verify that the client device 100 and/or a user of the client device 100 are authorized to connect to the public network using the networking device 114 (e.g., the networking device 114 may authenticate the client device 100 using at least one of a certificate, a key, a username, a password, a client identifier of the client device 100, etc.).

FIG. 1E illustrates establishment of the connection (shown with reference number 140) between the client device 100 and the public network (shown with reference number 142). In some examples, the connection 140 may comprise a connection (e.g., an encrypted wireless connection over a WLAN) between the client device 100 and the networking device 114 and/or a connection (e.g., an encrypted connection over a WAN) between the networking device 114 and the public network 142. The client device 100 may access resources (e.g., internet resources, such as websites, webpages, web applications, etc.) over the connection 140. In some examples, the second client identifier (e.g., a second IP address) may be used to identify the client device 100 in association with activity performed over the connection 140 between the client device 100 and the public network 142 (e.g., the Internet). In an example, the second client identifier may comprise a public identifier (e.g., a public IP address) of the client device 100 and/or a public identifier (e.g., a public IP address) of the networking device 114.

FIG. 1F illustrates a networking device configuration interface 152 displayed on the client device 100 (or other device connected to the networking device 114). The networking device configuration interface 152 may be displayed via a browser of the client device 100. The networking device configuration interface 152 may display information indicating specifications and/or settings of the networking device 114 (e.g., the client-side router), and/or may comprise selectable inputs for configuring settings of the networking device 114.

The networking device configuration interface 152 may comprise information 154 indicative of (i) an internet status of the networking device 114 (e.g., the internet status may indicate whether or not the networking device 114 has a connection to the Internet), (ii) a WAN IP of the networking device 114 (e.g., the WAN IP may be used to identify one or more client devices in association with activity performed by the one or more client devices using a connection between the networking device 114 and the Internet), and/or (iii) a Dynamic Domain Name System (DDNS) setting associated with the networking device 114. The networking device configuration interface 152 may comprise information 156 indicative of a security protocol (e.g., Wi-Fi Protected Access II-Personal (WPA2-Personal)) used by the networking device 114 to secure a WLAN associated with the networking device 114. The networking device configuration interface 152 may comprise an indication 168 of a configuration mode (and/or networking device type) of the networking device 114 (e.g., the indication 168 may indicate that the networking device 114 comprises and/or is used as a wireless router).

The networking device configuration interface 152 may comprise a selectable input 158 (e.g., a pull down menu) that may be selected to display SSIDs (e.g., the first SSID 104 and/or the second SSID 106) that the networking device 114 is configured with. In response to a selection of a SSID of the SSIDs (displayed in the pull down menu, for example), one or more other selectable inputs in the networking device configuration interface 152 may be used to view and/or adjust networking settings associated with the SSID. The networking device configuration interface 152 may comprise a selectable input 160 (e.g., a pull down menu) that may be used to display and/or select one or more authentication methods and/or security protocols (e.g., at least one of Wi-Fi Protected Access (WPA), Wi-Fi Protected Access II (WPA2), Wi-Fi Protected Access III (WPA3), etc.). The networking device configuration interface 152 may comprise a selectable input 162 (e.g., a pull down menu) that may be used to display and/or select one or more encryption protocols (e.g., WPA encryption protocols) that the networking device 114 uses for communication with one or more client devices in the WLAN. The networking device configuration interface 152 may comprise an input 164 (e.g., a text field) that may be used to configure a key (e.g., a Wi-Fi Protected Access Pre-Shared Key (WPA-PSK)) for use in authenticating one or more client devices in the WLAN. The networking device configuration interface 152 may comprise a selectable input 166 (e.g., a button) that may be selected to apply one or more changed settings (e.g., at least one of authentication method, security protocol, encryption protocol, the key, etc.).

In some examples, in response to receiving the second network-access request 134 and/or authenticating (e.g., successfully authenticating) the client device 100, the connection 140 between the client device 100 and the public network 142 may be established (by the networking device 114) automatically and/or without manual intervention. Alternatively and/or additionally, if the first encrypted connection 122 is established when the second network-access request 134 is received, in response to receiving the second network-access request 134 and/or authenticating (e.g., successfully authenticating) the client device 100, the networking device 114 may (i) disconnect the first encrypted connection 122 between the networking device 114 and the first remote private network 120, and/or (ii) disconnect the client device 100 and/or the networking device 114 from the first remote private network 120 (such that the client device 100 and/or the networking device 114 are no longer connected to the first remote private network 120, for example).

In some examples, prior to receiving the first network-access request 112, the networking device 114 may be provided with a first network configuration associated with the first remote private network 120, and/or the first network configuration may be enabled. In some examples, the first network configuration may correspond to (and/or may be implemented on) a container (e.g., a router container) of the networking device 114 (e.g., the client-side router). For example, the first network configuration (and/or the container) may be deployed to (and/or implemented on) the networking device 114 (and/or other networking devices) via a container system and/or a container runtime (e.g., Linux® Containers (LXC)). The first network configuration may be executed to establish and/or maintain encrypted connections (e.g., the first encrypted connection 122) that connect the networking device 114 and/or the client device 100 to the first remote private network 120. For example, the networking device 114 may establish and/or maintain encrypted connections that connect the networking device 114 and/or the client device 100 to the first remote private network 120 based upon parameters and/or settings of the first network configuration. Alternatively and/or additionally, the first SSID 104 may be enabled (e.g., broadcasted and/or implemented) by the networking device 114 based upon an indication of the first SSID 104 (e.g., "Work Network") in the first network configuration.

FIG. 1G illustrates communication between a remote network management computer 170 and one or more devices comprising the client device 100, the networking device 114, the first remote private network 120 and/or an administration device 172 (e.g., a cloud administration device). In some examples, the remote network management computer 170 may be configured to (i) provide networking devices (e.g., client-side routers) with network configurations for use in connecting to one or more remote private networks, (ii) manage service profiles of client devices that are authorized to access wireless communication services of the one or more remote private networks, and/or (iii) provision authentication credentials to networking devices and/or the one or more remote private networks for use in granting client devices with access to resources of the one or more remote private networks. The one or more remote private networks may comprise a plurality of remote private networks associated with a plurality of entities (e.g., different organizations, businesses, universities, etc. that are associated with employees, students, etc. that remotely access resources on respective remote private networks).

The remote network management computer 170 may be implemented in a cloud, such as a Virtual Private Cloud (VPC). The remote network management computer 170 may be provided with service information associated with one or more users (e.g., one or more company employees of the first entity associated with the first remote private network 120). The service information may be transmitted to the remote network management computer 170 by the administration device 172. The service information may comprise information (e.g., identification information, resource access information, etc.) associated with the client device 100 and/or a user of the client device 100 (e.g., an employee of the first entity that is authorized to access resources of the first remote private network 120).

The remote network management computer 170 may generate a first service profile (e.g., an employee profile), associated with the client device 100 and/or the user, based upon the information associated with the client device 100 and/or the user. The first service profile may comprise at least some of the information. The first service profile may be indicative of (i) first client identification information associated with the client device 100 (e.g., the first client identification information may comprise at least one of a MAC address of the client device 100, a device identifier of the client device 100, identification information of the networking device 114, etc.), (ii) first user identification information (e.g., employee information) associated with the user of the client device 100 (e.g., the first user identification information may comprise at least one of a name, a home address, a job title, a username, etc. of the user), (iii) a first level of access, of the client device 100, to resources of the first remote private network 120 (e.g., the first level of access may be indicative of one or more resources, of the first remote private network 120, that the client device 100 and/or the user are authorized to access), and/or (iv) other information associated with services accessible to the client device 100.

In response to determining (e.g., receiving and/or generating) the first service profile, the remote network management computer 170 may store the first service profile in a service profile store (e.g., a service profile database). In some examples, the remote network management computer 170 may update the first service profile in response to receiving an indication (received from the administration device 172, for example) of a change to at least one of the first client identification information, the first user identification information, the first level of access, etc. (e.g., the change may be a result of at least one of the user being issued a new laptop, the user moving to a different home address, the user being assigned a different level of access due to a change in employment, etc.). Service profiles in the service profile store may be used to tailor remote network connections to remote private networks to individual needs and/or authorization levels of users.

In some examples, the remote network management computer 170 may provide the networking device 114 with the first network configuration. The first network configuration may be enabled on the networking device 114 (e.g., the client-side router). In an example, the remote network management computer 170 may provide the networking device 114 with the first network configuration by transmitting the first network configuration to the networking device 114 over a connection 176.

In some examples, the first network configuration may be determined based upon networking device information comprising (i) a device type of the networking device 114 (e.g., a router type of the client-side router), (ii) a device model of the networking device 114 (e.g., a router model of the client-side router), and/or (iii) a device identifier of the networking device 114 (e.g., a router identifier of the client-side router), such as at least one of a serial number of the networking device 114, a MAC address of the networking device 114, an IP address of the networking device 114, etc. For example, the remote network management computer 170 may use the networking device information to determine (e.g., select and/or generate) the first network configuration such that the first network configuration is compatible with the networking device 114 (e.g., such that the first network configuration can be successfully enabled on the networking device 114 and/or used by the networking device 114 to establish encrypted connections with the first remote private network 120). The remote network management computer 170 may select, based upon the networking device information, the first network configuration from a plurality of network configurations associated with various device types and/or various device models. Alternatively and/or additionally, the remote network management computer 170 may generate the first network configuration based upon the networking device information. Alternatively and/or additionally, a network configuration selection interface may be displayed on a device (e.g., the client device 100, the administration device 172, and/or other device). The network configuration selection interface may display information associated with the plurality of network configurations. The network configuration selection interface may be used to find and/or select the first network configuration compatible with the networking device 114.

In some examples, the remote network management computer 170 may transmit the first network configuration to the networking device 114 in response to receiving a network configuration request from the networking device 114 and/or the client device 100 (and/or other device). The network configuration request may correspond to a request for a network configuration for establishing connections between the networking device 114 and the first remote private network 120. The network configuration request may be indicative of (i) the networking device information (based upon which the first network configuration is determined, for example), (ii) client information (e.g., at least some of the first client identification information) associated with the client device 100, and/or (iii) network information associated with the first remote private network 120 (e.g., the network information may be indicative of one or more identifiers of the first remote private network 120, such as at least one of an IP address, a MAC address, an account name, etc. of the first remote private network 120). The remote network management computer 170 may determine the first network configuration based upon the network configuration request (e.g., based upon the networking device information, the client information, and/or the network information). In response to receiving the first network configuration, the networking device 114 may enable the first network configuration.

In some examples, the networking device 114 may transmit the network configuration request to the remote network management computer 170 in response to receiving a provisioning request (e.g., a router provisioning request) from the client device 100 or other device. The provisioning request may be indicative of the networking device information, the client information, and/or the network information. In some examples, the network configuration request comprises the provisioning request (e.g., the networking device 114 may forward the provisioning request to the remote network management computer 170).

In some examples, a device (e.g., the client device 100, the administration device 172, and/or other device) may transmit the network configuration request (and/or the provisioning request) to the remote network management computer 170. The remote network management computer 170 may transmit the first network configuration to the device in response to the network configuration request (and/or the provisioning request). The device may transmit (e.g., forward) the first network configuration to the networking device 114 in response to receiving the first network configuration package from the remote network management computer 170.

In some examples, the remote network management computer 170 may provide the first network configuration in response to determining that the client device 100 and/or the user of the client device 100 are authorized to connect to and/or access resources of the first remote private network 120. For example, the remote network management computer 170 may determine the first network configuration and/or provide the networking device 114 with the first network configuration in response to authenticating the client device 100 and/or the user of the client device 100. In some examples, the client device 100 may be authenticated based upon a determination that one or more client identifiers (e.g., at least one of a MAC address, a device identifier, an IP address, identification information of the networking device 114, etc.) indicated by the network configuration request matches one or more client identifiers indicated by the first service profile (e.g., the employee profile) stored in the service profile store.

In some examples, the remote network management computer 170 may (i) transmit first authentication information to the client device 100 and/or the networking device 114 and/or (ii) transmit second authentication information to the first remote private network 120. The first authentication information and/or the second authentication information may be used by the networking device 114 and/or the first remote private network 120 to establish encrypted connections (e.g., the first encrypted connection 122) between the networking device 114 and the first remote private network 120.

In an example, the first authentication information and/or the second authentication information may comprise one or more authentication credentials that can be used to authenticate communication between the networking device 114 and the first remote private network 120. The one or more authentication credentials may comprise at least one of a certificate, a key, a username, a password, a client identifier of the client device 100, a network identifier of the first remote private network 120, etc. In an example, the first remote private network 120 may (i) authenticate the client device 100 and/or the networking device 114 based upon a comparison of the one or more second credentials received from the networking device 114 and the second authentication information, and/or (ii) allow establishment of the first encrypted connection 122 in response to authenticating the client device 100 and/or the networking device 114.

Alternatively and/or additionally, the first authentication information (transmitted to the networking device 114, for example) may indicate that (i) the client device 100 is authorized to connect to the first remote private network 120, and/or (ii) other devices (other than the client device 100) are not authorized to connect to the first remote private network 120. For example, the first authentication information may be indicative of one or more client identifiers (e.g., at least one of a MAC address, a device identifier, an IP address, etc.) of the client device 100. The networking device 114 may establish the first encrypted connection 122 between the networking device 114 and the first remote private network 120 in response to a determination that the client device 100 (from which the first network-access request 112 is received) corresponds to the one or more client identifiers indicated by the first authentication information. In some examples, in response to receiving a network-access request that indicates the first SSID 104 from a device different than the client device 100, the networking device 114 (i) may determine that the device is not authorized to connect to the first remote private network 120, (ii) may not establish an encrypted connection with the first remote private network 120 in response to determining that the device is not authorized to connect to the first remote private network 120, and/or (iii) may not allow the device to connect to the first remote private network 120.

In some examples, the first authentication information may be transmitted to the networking device 114 and/or the client device 100 in conjunction with transmitting the first network configuration to the networking device 114 and/or the client device 100. Alternatively and/or additionally, the first authentication information may be transmitted to the networking device 114 and/or the client device 100 separately from transmitting the first network configuration to the networking device 114 and/or the client device 100.

In some examples, prior to receiving the first network-access request 112, as an alternative (or in addition) to enabling the first network configuration on the networking device 114, a first client application associated with the first remote private network 120 may be installed on the networking device 114. In some examples, the first client application may correspond to (and/or may be installed on) a container of the networking device 114. For example, the first client application (and/or the container) may be deployed to (and/or implemented on) the networking device 114 (and/or other networking devices) via a container system and/or a container runtime (e.g., LXC). The first client application may be executed to establish and/or maintain encrypted connections (e.g., the first encrypted connection 122) that connect the networking device 114 and/or the client device 100 to the first remote private network 120. For example, the networking device 114 may establish and/or maintain encrypted connections that connect the networking device 114 and/or the client device 100 to the first remote private network 120 based upon parameters and/or settings of the first client application. Alternatively and/or additionally, the first SSID 104 may be enabled (e.g., broadcasted and/or implemented) by the networking device 114 based upon an indication of the first SSID 104 (e.g., "Work Network") in the first client application.

In some examples, the networking device 114 may be provided with the first client application (and/or the first client application may be installed on the networking device 114) using the remote network management computer 170 and/or the client device 100. In an example, the networking device 114 may be provided with the first client application (and/or the first client application may be installed on the networking device 114) using the techniques provided herein with respect to providing the networking device 114 with the first network configuration and/or enabling the first network configuration. The first client application may be determined (e.g., generated and/or selected from a plurality of client applications) based upon the networking device information (e.g., the device type of the networking device 114, the device model of the networking device 114, etc.) such that the first client application is compatible with the networking device 114 (e.g., such that the first client application can be successfully installed on the networking device 114 and/or used by the networking device 114 to establish encrypted connections with the first remote private network 120).

The remote network management computer 170 may transmit the first service profile to the first remote private network 120 over a connection 174. In some examples, when the first encrypted connection 122 is established, the first remote private network 120 may provide the client device 100 with access to resources according to the first level of access indicated by the first service profile. For example, the client device 100 may be granted access to resources that the first service profile indicates are accessible to the client device 100 and/or the user of the client device 100.

In some examples, the connections 174 and/or 176 may comprise secure control connections. For example, the connection 174 and/or the connection 176 may comprise a transport layer security (TLS) connection (over port 443, for example) using Transmission Control Protocol (TCP).

Figure 3A:
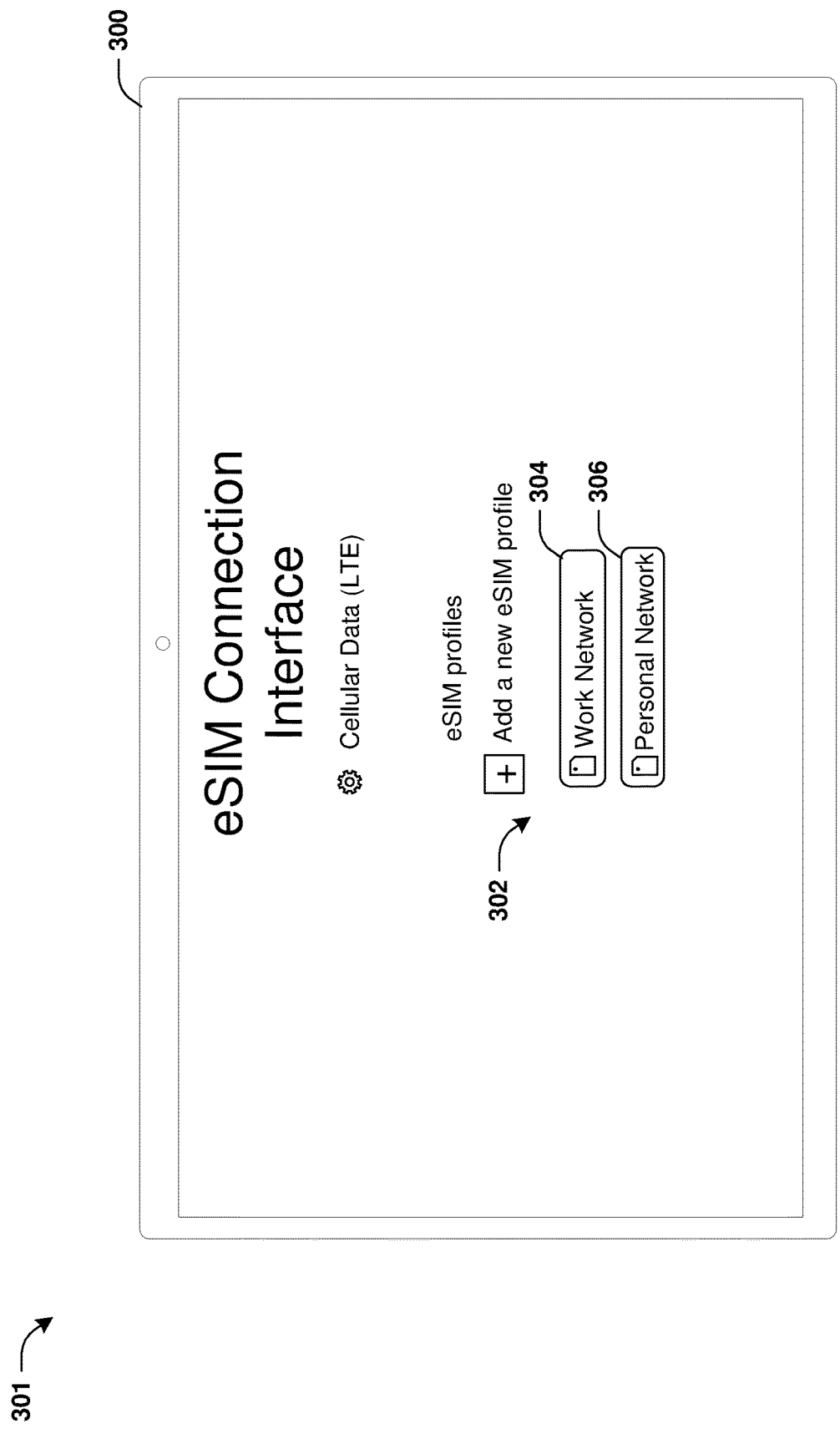
FIG. 3A is a diagram illustrating an example system for providing client devices with network connections using a plurality of embedded Subscriber Identity Module (eSIM) profiles, where a client device displays a list of eSIM profiles according to some embodiments.
Figure 3B:
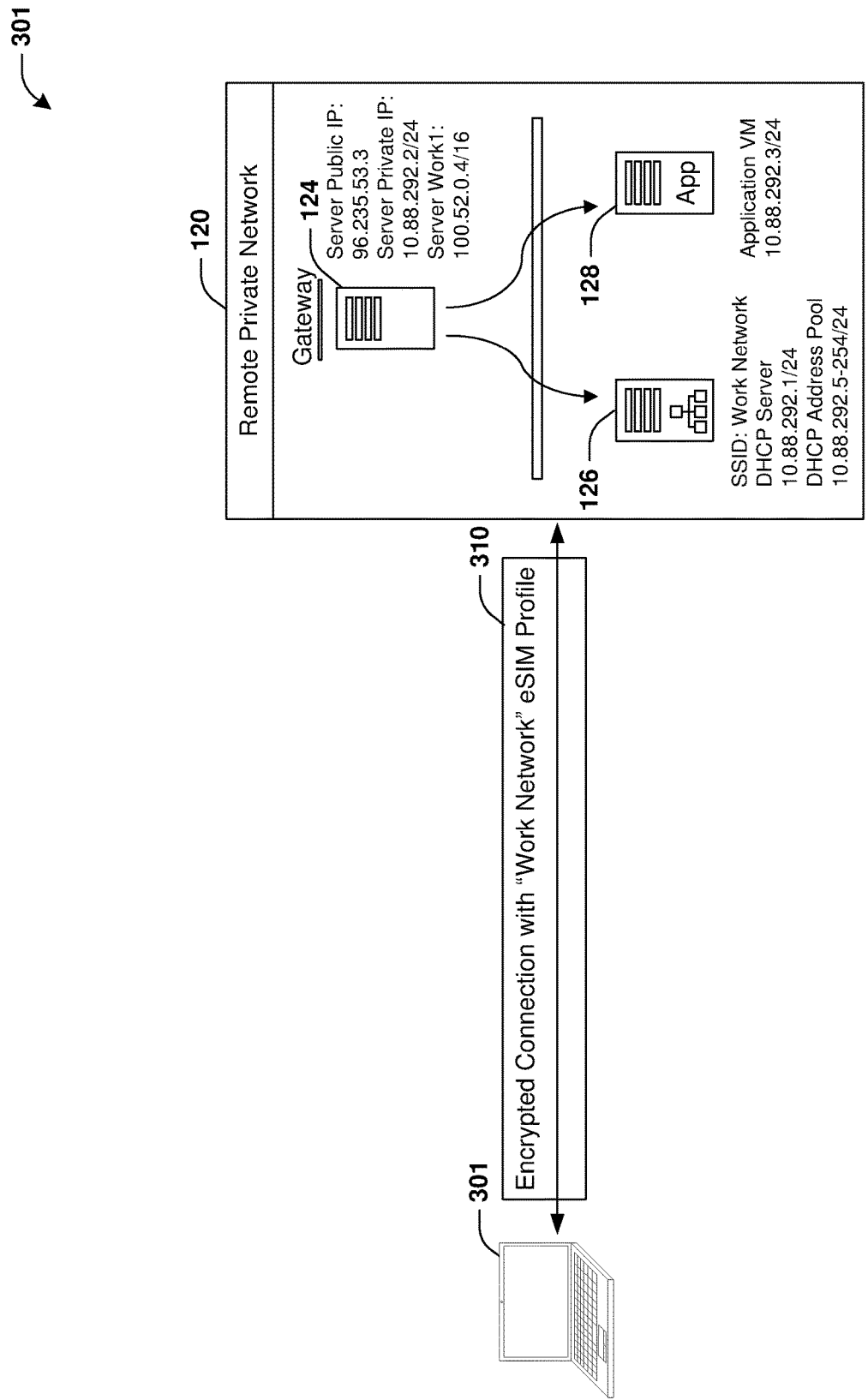
FIG. 3B is a diagram illustrating an example system for providing client devices with network connections using a plurality of eSIM profiles, where an encrypted connection is established using a first eSIM profile according to some embodiments.
Figure 3C:
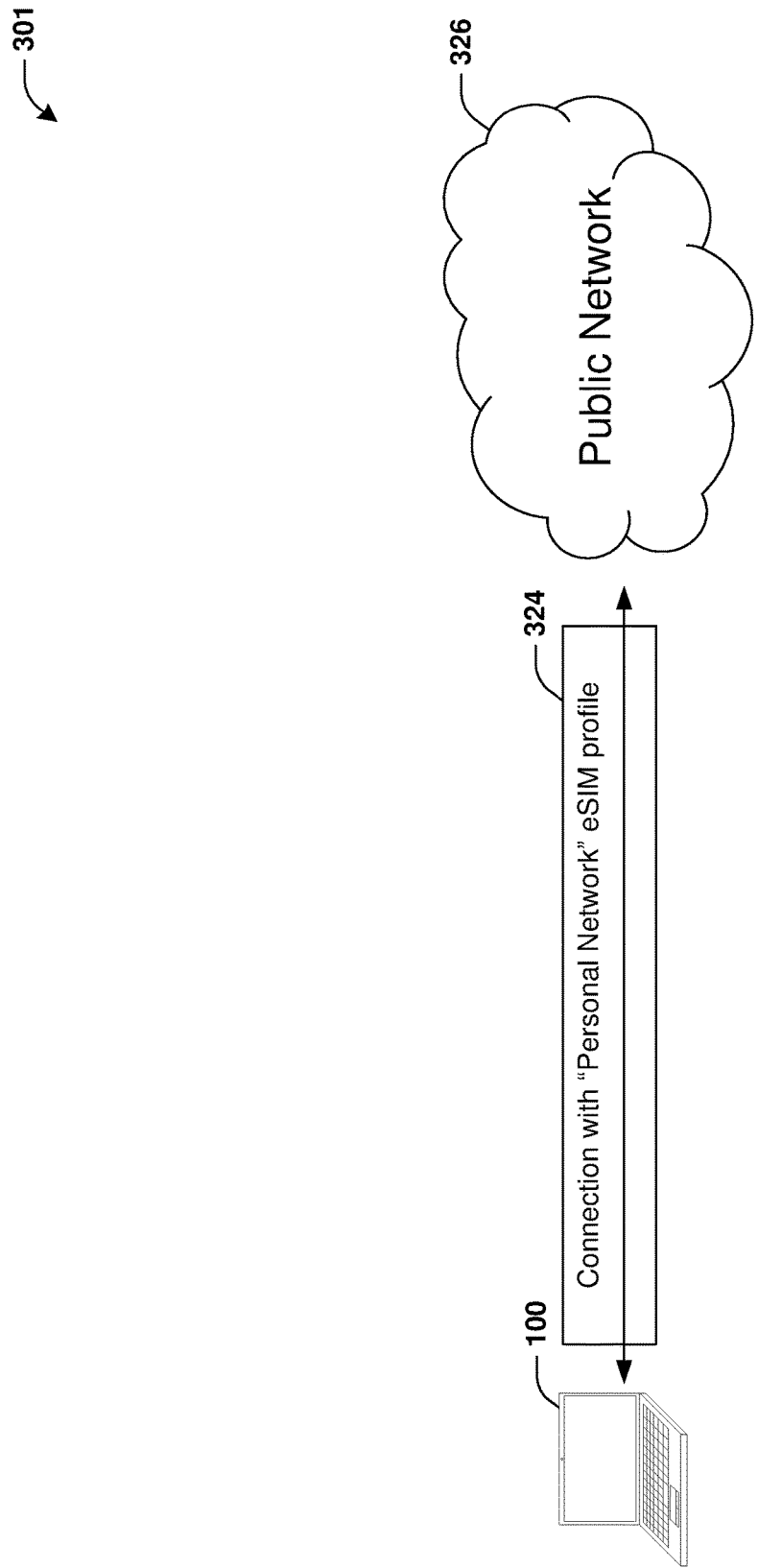
FIG. 3C is a diagram illustrating an example system for providing client devices with network connections using a plurality of eSIM profiles, where a connection is established using a second eSIM profile according to some embodiments.

FIGS. 3A-3C illustrate an example of a system 301 for providing client devices with network connections using a plurality of eSIM profiles. The plurality of eSIM profiles may comprise a first eSIM profile associated with a connection to the first remote private network 120, a second eSIM profile associated with a connection to a public network (e.g., the Internet), and/or one or more other eSIM profiles.

FIG. 3A illustrates a client device 300 displaying a list of eSIM profiles 302 comprising selectable inputs associated with the plurality of eSIM profiles. The client device 300 may be at least one of a laptop, a phone, a tablet, etc. The list of eSIM profiles 302 may comprise a first selectable input 304 (e.g., "Work Network") associated with the first eSIM profile and/or a second selectable input 306 (e.g., "Personal Network") associated with the second eSIM profile.

Figure 4:
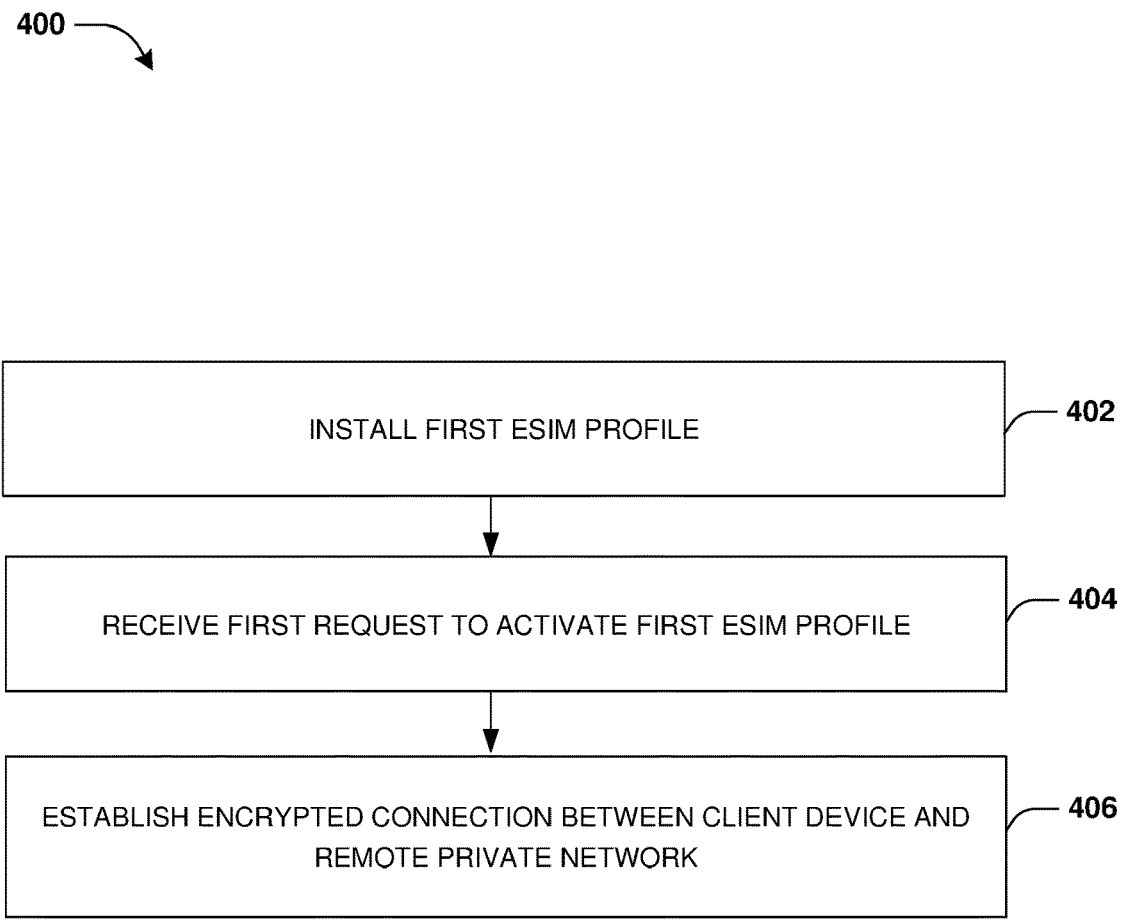
FIG. 4 is a flow chart illustrating an example method for providing client devices with network connections using a plurality of eSIM profiles in accordance with an embodiment.

An embodiment of providing client devices with network connections using the plurality of eSIM profiles is illustrated by an example method 400 of FIG. 4, and is further described in conjunction with FIGS. 3A-3C. The example method 400 may comprise one, some and/or all techniques, features and/or aspects shown in and/or described with respect to FIGS. 1A-1G and/or FIG. 2. At 402, the first eSIM profile is installed on an eSIM of the client device 300. The list of eSIM profiles 302 may include the first selectable input 304 (associated with the first eSIM profile) in response to the first eSIM profile being installed on the eSIM of the client device 300. The client device 300 may install the first eSIM profile associated with the first remote private network 120 (on the eSIM) using eSIM profile information (e.g., authentication information, network information of the first remote private network 120, etc.). The eSIM profile information may be provided by the remote network management computer 170 (e.g., the remote network management computer 170 may provide the client device 300 with the eSIM profile information to install the first eSIM profile using the techniques provided herein with respect to providing the networking device 114 with the first network configuration and/or enabling the first network configuration). In some examples, the second eSIM profile may be installed on the eSIM before, concurrently with, and/or after installation of the first eSIM profile. Alternatively and/or additionally, the second eSIM profile may be a default eSIM profile of the eSIM.

At 404, the client device 300 may receive a first request to activate the first eSIM profile. In some examples, the first request may be received via a selection of the first selectable input 304 (shown in FIG. 3A) associated with the first SIM profile. At 406, in response to receiving the first request, the client device 300 may establish, using the eSIM, a second encrypted connection between the client device 300 and the first remote private network 120. Alternatively and/or additionally, the client device 300 may access, using the eSIM, resources (e.g., files, applications, etc.) of the first remote private network 120. For example, the resources of the first remote private network 120 may be accessed by the client device 300 via the second encrypted connection.

In some examples, the client device 300 (and/or the eSIM of the client device 300) may have internet service provided by a telecommunication service (e.g., the internet service may comprise at least one of cellular internet service, 5G internet service, 4G internet service, satellite internet service, and/or other type of internet service). When the client device 300 is within coverage of the telecommunication service (e.g., when the client device 300 is within a threshold distance of a base station of the telecommunication service), the client device 300 may access the internet service using the eSIM. The client device 300 may use the internet service to establish the second encrypted connection (between the client device 300 and the first remote private network 120) and/or to access the resources of the first remote private network 120 via the second encrypted connection.

FIG. 3B illustrates establishment of the second encrypted connection (shown with reference number 310) between the client device 300 and the first remote private network 120. In some examples, the second encrypted connection 310 may be established via a VPN, via tunneling (e.g., at least one of WireGuard® tunneling, SSH tunneling, etc.), and/or via one or more other techniques. The second encrypted connection 310 may be a secure peer-to-peer connection (e.g., a UDP connection over port 51820). Alternatively and/or additionally, the second encrypted connection 310 may comprise a zero-touch VPN connection in a secure tunnel, and/or may be established using a SD-WAN-based architecture. The second encrypted connection 310 may be established using based upon parameters and/or settings of the first eSIM profile.

In some examples, establishing the second encrypted connection 310 and/or accessing resources of the first remote private network 120 via the second encrypted connection 310 may be performed using one or more of the techniques shown in and/or described with respect to FIGS. 1A-1G and/or FIG. 2. The second encrypted connection 310 and/or resources of the first remote private network 120 accessed by the client device 300 may include aspects of the first encrypted connection 122 and/or resources of the first remote private network 120 accessed by the client device 100 as shown in and/or described with respect to FIGS. 1A-1G and/or FIG. 2.

The client device 300 may receive a second request to activate the second eSIM profile. In some examples, the second request may be received via a selection of the second selectable input 306 (shown in FIG. 3A) associated with the second eSIM profile. In response to receiving the second request, the client device 300 may establish, using the eSIM, a connection (e.g., a direct connection) between the client device 300 and the public network (e.g., the Internet). Alternatively and/or additionally, the client device 300 may access resources (e.g., files, applications, etc.) of the public network (over the connection). The client device 300 may establish the connection and/or access the resources of the public network using the internet service provided by the telecommunication service.

FIG. 3C illustrates establishment of the connection (shown with reference number 324) between the client device 300 and the public network (shown with reference number 326). In some examples, establishment of the connection 324 and/or accessing resources of the public network 326 via the connection 324 may be performed using one or more of the techniques shown in and/or described with respect to FIGS. 1A-1G and/or FIG. 2. The connection 324 and/or resources of the public network 326 accessed by the client device 300 may include aspects of the connection 140 and/or resources of the public network 142 accessed by the client device 100 as shown in and/or described with respect to FIGS. 1A-1G and/or FIG. 2.

Figure 5:
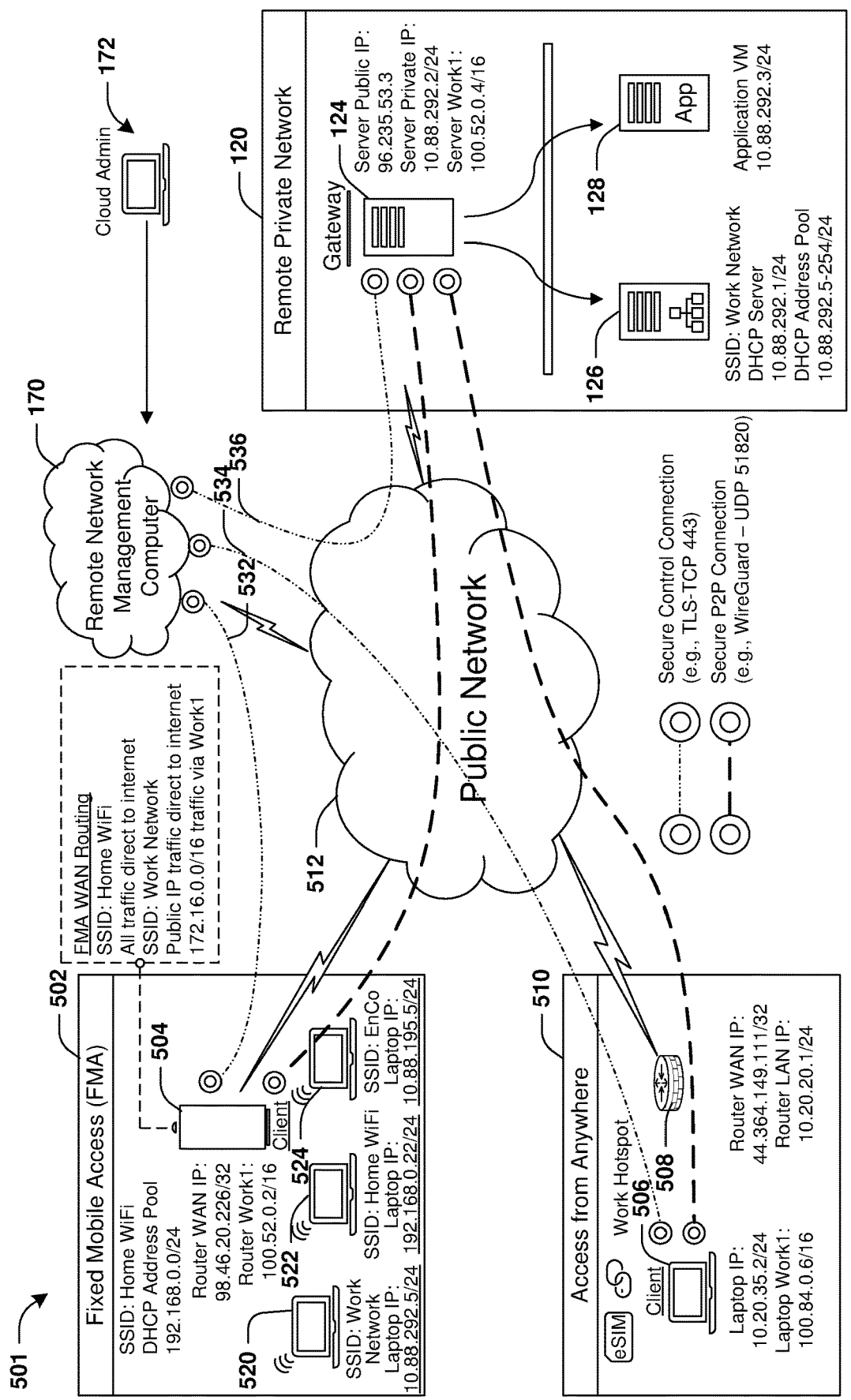
FIG. 5 is a diagram illustrating an example system for managing network connections between one or more remote private networks and client devices in accordance with an embodiment.

FIG. 5 illustrates a system 501 associated with managing network connections between one or more remote private networks and client devices. The system 501 may comprise the remote network management computer 170, the administration device 172, the first remote private network 120 (and/or one or more other remote private networks not shown in FIG. 5), devices in a Fixed Mobile Access (FMA) configuration 502, and/or devices in an Access from Anywhere configuration 510.

The FMA configuration 502 may comprise a client-side router 504 (e.g., an example of the networking device 114 that comprises a client-side router) that may be positioned in a fixed location (e.g., a home, a satellite office, etc.). The client-side router 504 may be associated with a plurality of SSIDs comprising the first SSID 104 (e.g., "Work Network"), the second SSID 106 (e.g., "Home WiFi") and/or a third SSID (e.g., "EnCo"). In response to a client device 520 sending a network-access request indicating the first SSID 104, the client-side router 504 may establish an encrypted connection (e.g., the first encrypted connection 122) to connect the client device 520 to the first remote private network 120. In response to a client device 522 sending a network-access request indicating the second SSID 106, the client-side router 504 may connect (e.g., via the connection 140) the client device 520 to a public network 512 (e.g., the Internet).

In response to a client device 524 sending a network-access request indicating the third SSID (e.g., "EnCo"), the client-side router 504 may establish an encrypted connection to connect the client device 524 to a second remote private network (not shown) associated with a second entity (e.g., at least one of an enterprise, an organization, a company, a business, a school, a university, etc.), which may be different than the first entity. In an example, the client-side router 504 may establish the encrypted connection (e.g., an encrypted connection between the client-side router 504 and the second remote private network) using one or more of the techniques provided herein with respect to establishing the first encrypted connection 122. In some examples, a second network configuration (and/or a second client application) associated with the third SSID and/or the second remote private network may be provided to the client-side router 504 and/or enabled on the client-side router 504 (using the remote network management computer 170, for example) using one or more of the techniques provided herein with respect to providing and/or enabling the first network configuration (and/or the first client application) associated with the first SSID 104 and/or the first remote private network 120. For example, the remote network management computer 170 may configure and/or manage at least one of authentication information, service profiles, network configurations, client applications, etc. for multiple remote private networks using the techniques provided herein with respect to the first remote private network 120. In some examples, the network configurations and/or the client applications may be deployed and/or implemented on networking devices (e.g., the client-side router 504) using a container-based approach (e.g., LXC).

The Access from Anywhere configuration 510 may comprise an eSIM-equipped client device 506 (e.g., the client device 300) and/or a mobile hotspot device 508 (e.g., an example of the networking device 114 that comprises a mobile hotspot device) that allow a user to access the first remote private network 120 (and/or the second remote private network) from various locations (e.g., anywhere that the eSIM-equipped client device 506 and/or the mobile hotspot device 508 are within coverage of internet service).

In some examples, the remote network management computer 170 may communicate with the client-side router 504, the first remote private network 120, the eSIM-equipped client device 506 and/or the mobile hotspot device 508 via one or more first connections comprising a connection 532, a connection 534 and/or a connection 536 (e.g., the one or more first connections may be used to provide at least one of network configurations, authentication information, eSIM profile information, service profiles, etc.). The one or more first connections may comprise secure control connections.

Figure 6:
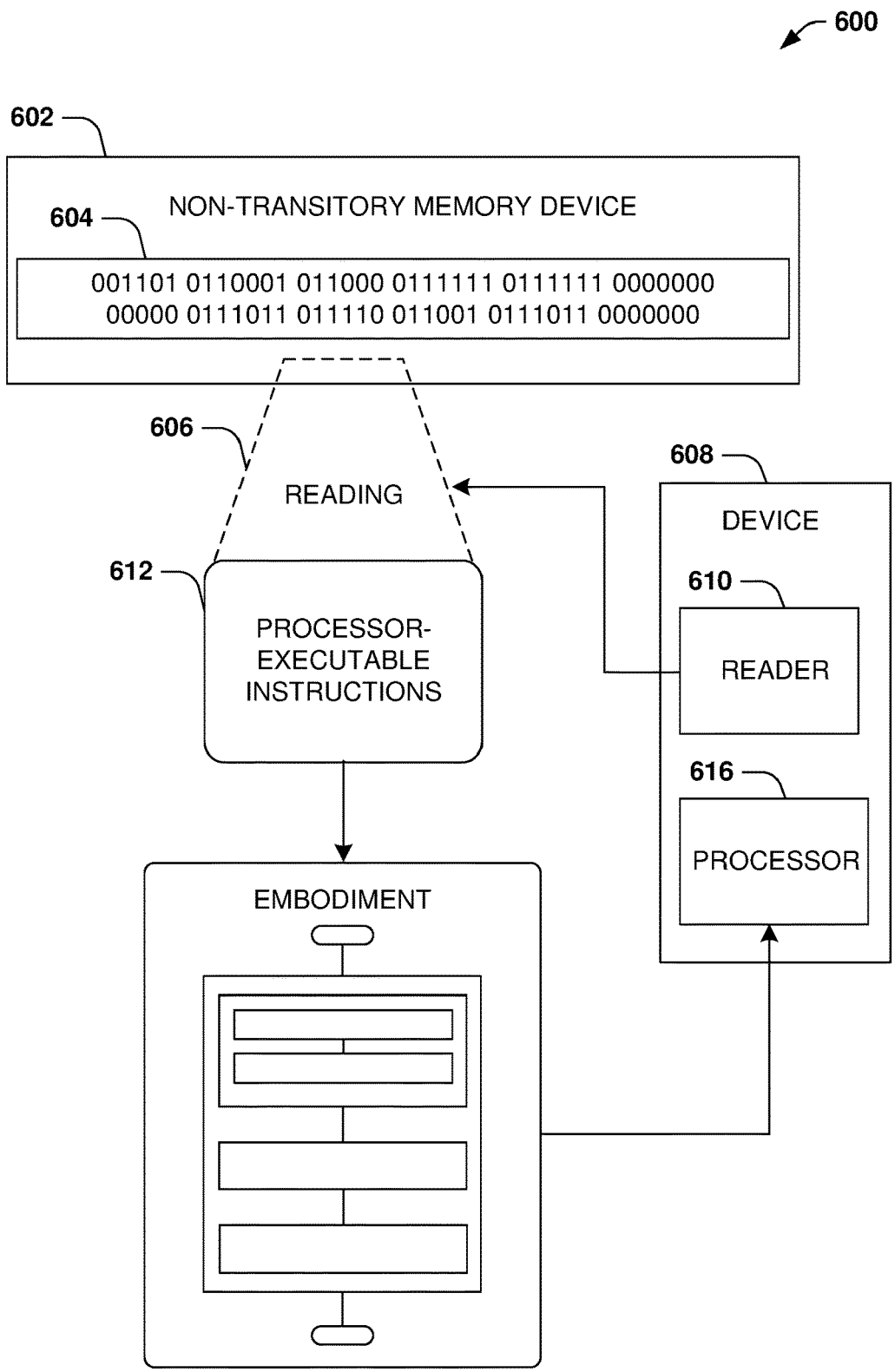
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the exemplary method 200 of FIG. 2 and/or the exemplary method 400 of FIG. 4, for example. In some embodiments, the processor-executable instructions 612 are configured to cause implementation of a system, such as at least some of the example system 101 of FIGS. 1A-1G, the example system 301 of FIGS. 3A-3C and/or the example system 501 of FIG. 5, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   receiving, by a client-side router and from a client device, a first network-access request indicative of a first service set identifier (SSID) of a plurality of SSIDs associated with the client-side router; and
   in response to receiving the first network-access request indicative of the first SSID:
      establishing, by the client-side router, an encrypted connection between the client-side router and a remote private network; and
      providing, by the client-side router and via the encrypted connection, the client device with access to resources of the remote private network.

2. The method of claim 1, comprising:
   receiving, by the client-side router and from the client device, a second network-access request indicative of a second SSID of the plurality of SSIDs associated with the client-side router; and
   in response to receiving the second network-access request indicative of the second SSID, establishing, by the client-side router, a connection between the client device and the Internet.

3. The method of claim 1, wherein:
   the remote private network comprises a gateway computer; and
   establishing the encrypted connection comprises establishing a peer-to-peer connection between the client-side router and the gateway computer of the remote private network.

4. The method of claim 1, wherein:
   the remote private network comprises one or more application computers; and
   providing the client device with access to the resources of the remote private network comprises providing the client device with access to one or more resources of one or more applications hosted on the one or more application computers.

5. The method of claim 2, wherein:
   the remote private network comprises a Dynamic Host Configuration Protocol (DHCP) server;
   the method comprises receiving, by the client-side router and from the DHCP server, an assignment of a first client identifier for the client device;
   the first client identifier is used to identify the client device in association with activity performed over the encrypted connection between the client-side router and the remote private network; and
   the first client identifier is different than a second client identifier used to identify the client device in association with activity performed over the connection between the client device and the Internet.

6. The method of claim 5, wherein:
   the first client identifier is a first Internet Protocol (IP) address selected from an address pool of the DHCP server; and
   the second client identifier is a second IP address.

7. The method of claim 1, comprising:
   prior to receiving the first network-access request, enabling, on the client-side router, a first network configuration associated with the remote private network, wherein establishing the encrypted connection between the client-side router and the remote private network is performed using the first network configuration.

8. The method of claim 7, comprising:
   prior to enabling the first network configuration on the client-side router, receiving, by the client-side router and from the client device, a router provisioning request indicative at least one of:
      client information associated with the client device; or
      network information associated with the remote private network;
   in response to receiving the router provisioning request, transmitting, by the client-side router and to a remote network management computer, a request for a network configuration for establishing connections between the client-side router and the remote private network, wherein the request is indicative of the client information and the network information; and
   receiving, by the client-side router and from the remote network management computer, the first network configuration, wherein enabling the first network configuration is performed in response to receiving the first network configuration from the remote network management computer.

9. The method of claim 7, comprising:
   prior to enabling the first network configuration on the client-side router, determining a router provisioning request indicative of at least one of client information associated with the client device or network information associated with the remote private network; and
   determining the first network configuration based upon the router provisioning request, wherein installing the first network configuration is performed in response to determining the first network configuration.

10. The method of claim 9, wherein:
    determining the first network configuration is performed based upon at least one of a router type of the client-side router, a router model of the client-side router, or a router identifier of the client-side router.

11. The method of claim 1, wherein:
    the access to the resources of the remote private network is provided to the client device according to a service profile of resources accessible to the client device.

12. The method of claim 1, comprising:
    providing, by the client-side router and for the client device, a list of one or more SSIDs comprising the first SSID, wherein the first network-access request is received in response to a selection of the first SSID from the list of one or more SSIDs.

13. The method of claim 1, comprising:
prior to receiving the first network-access request, installing, on the client-side router, a first client application associated with the remote private network, wherein establishing the encrypted connection between the client-side router and the remote private network is performed using the first client application.

14. A method comprising:
receiving, by a mobile hotspot device and from a client device, a first network-access request indicative of a first service set identifier (SSID) of a plurality of SSIDs associated with the mobile hotspot device; and
in response to receiving the first network-access request indicative of the first SSID:
establishing, by the mobile hotspot device, an encrypted connection between the mobile hotspot device and a remote private network; and
providing, by the mobile hotspot device and via the encrypted connection, the client device with access to resources of the remote private network.

15. The method of claim 14, comprising:
receiving, by the mobile hotspot device and from the client device, a second network-access request indicative of a second SSID of the plurality of SSIDs associated with the mobile hotspot device; and
in response to receiving the second network-access request indicative of the second SSID, establishing, by the mobile hotspot device, a connection between the client device and the Internet.

16. The method of claim 14, wherein:
the remote private network comprises a gateway computer; and
establishing the encrypted connection comprises establishing a peer-to-peer connection between the mobile hotspot device and the gateway computer of the remote private network.

17. The method of claim 14, wherein:
the remote private network comprises one or more application computers; and
providing the client device with access to the resources of the remote private network comprises providing the client device with access to one or more resources of one or more applications hosted on the one or more application computers.

18. The method of claim 15, wherein:
the remote private network comprises a Dynamic Host Configuration Protocol (DHCP) server;
the method comprises receiving, by the mobile hotspot device and from the DHCP server, an assignment of a first Internet Protocol (IP) address for the client device;
the first IP address is used to identify the client device in association with activity performed over the encrypted connection between the mobile hotspot device and the remote private network; and
the first IP address is different than a second IP address used to identify the client device in association with activity performed over the connection between the client device and the Internet.

* * * * *